United States Patent
Diaz Cervera et al.

(10) Patent No.: US 7,336,927 B2
(45) Date of Patent: Feb. 26, 2008

(54) AD-HOC EXTENSIONS OF A CELLULAR AIR INTERFACE

(75) Inventors: José Diaz Cervera, Valencia (ES); Rolf Sigle, Remshalden (DE)

(73) Assignee: Alcatel, Paris (FR)

( * ) Notice: Subject to any disclaimer, the term of this patent is extended or adjusted under 35 U.S.C. 154(b) by 279 days.

(21) Appl. No.: 11/147,194

(22) Filed: Jun. 8, 2005

(65) Prior Publication Data
US 2006/0002332 A1 Jan. 5, 2006

(30) Foreign Application Priority Data
Jun. 30, 2004 (EP) ................... 04291661

(51) Int. Cl.
*H04B 7/00* (2006.01)
(52) U.S. Cl. .................. 455/41.2; 455/11.1; 455/41.3; 455/426.1
(58) Field of Classification Search .............. 455/445, 455/11.1, 41.2, 41.3, 426.1, 426.2; 370/328
See application file for complete search history.

(56) References Cited

U.S. PATENT DOCUMENTS
2004/0002336 A1* 1/2004 Wu et al. ................... 455/445

FOREIGN PATENT DOCUMENTS
WO WO00/54539 A 9/2000
WO WO 2004/032536 * 4/2004
WO WO2004/032536 A 4/2004

* cited by examiner

*Primary Examiner*—Nay Maung
*Assistant Examiner*—Tuan H. Nguyen
(74) *Attorney, Agent, or Firm*—Sughrue Mion, PLLC

(57) ABSTRACT

Data transmission between a mobile client (1) and a cellular network (4) can be performed via an ad-hoc network (2) extension of the cellular network and a mobile relay (3). To reduce the overhead induced by the ad-hoc network (2) extension and still reap the benefits of extending the cellular network (4) by the ad-hoc network (2) it is suggested that a first part of the data that are transmitted from the mobile client (1) towards the cellular network (4) are transmitted directly via the air interface (8) and a second part of the data that are transmitted from the mobile client (1) towards the cellular network (4) are transmitted via the ad-hoc network (2) and the mobile relay (3). Alternatively or additionally it is suggested that a first part of the data that are transmitted from the cellular network (4) towards the mobile client (1) are transmitted directly via the air interface (8) and a second part of the data that are transmitted from the cellular network (4) towards the mobile client (1) are transmitted via the mobile relay (3) and the ad-hoc network (2).

12 Claims, 3 Drawing Sheets

AD-HOC EXTENSIONS OF A CELLULAR AIR INTERFACE

BACKGROUND OF THE INVENTION

The invention is based on a priority application EP04291661.9 which is hereby incorporated by reference.

The present invention relates to a method for transmitting data between a mobile client and a cellular network, wherein the cellular network comprises an air interface and the mobile client is connected to an ad-hoc network. The mobile client communicates via the ad-hoc network with a mobile relay that is connected to the ad-hoc network and the cellular network. The mobile relay relays data that are transmitted from the mobile client towards the cellular network and/or data that are transmitted from the cellular network towards the mobile client.

The invention also relates to a mobile client that is connectable to an ad-hoc network and connectable to a cellular network wherein the ad-hoc network comprises an ad-hoc network interface and the cellular network comprises an air interface for data transmission.

The invention furthermore relates to a telecommunications system comprising a cellular network, an ad-hoc network, a mobile client and a mobile relay. The mobile client is connected to the cellular network and the ad-hoc network and comprises means for communicating with the mobile relay via the ad-hoc network. The mobile relay is connected to the ad-hoc network and the cellular network and comprises means to relay data that are transmitted from the mobile client to the cellular network and/or data are transmitted from the cellular network to the mobile client.

The invention at least relates to a computer program that can be run on a data processing unit, in particular on a mobile client and/or a mobile relay.

A cellular network consists of different network elements such as a Core Network (CN), a Radio Access Network (RAN), and a mobile terminal (also called User Equipment, UE) e.g. a mobile telephone. Examples of cellular networks are GSM (Global System for Mobile communications) and UMTS (Universal Mobile Telecommunications System). In the remaining text the terminology according to the UMTS standard is used preferably.

The Radio Access Network (RAN) is composed of a collection of Radio Network Subsystems (RNS). Each RNS includes a Radio Network Controller (RNC) and several Node Bs that are attached to and controlled by the RNC.

The Node B is a physical unit for radio transmission (and reception) and is attached to one or more cells. The main task of the Node B is the transmission and reception of data to from the mobile terminal. In addition the Node B measures the quality and strength of the connection to the mobile terminal.

The RNC is responsible for the control of its associated Node Bs. Thus, it is in charge of the management of resources in those Node Bs and in the cells to which these Node Bs are attached. The different elements of the RAN are interconnected with each other and towards the CN by means of a transmission network, which is usually a terrestrial network. Consequently, the RAN is named UTRAN (UMTS Terrestrial Radio Access Network).

Several logical interfaces have been defined for the interconnection of different types of network elements across the transmission network. In particular, the communication between an RNC and any of the Node Bs belonging to the same RNS takes place across the so-called Iub interface. Moreover, different RNCs (belonging to different RNSs) may communicate with each other using the so-called Iur interface. Finally, the communication between an RNC and the Core Network (and hence between RAN and CN) takes place across a so-called Iu interface.

In UTRAN, the RNC may play several roles with respect to the different Node Bs and mobile terminals. In each RNS, there is a single RNC, which is responsible for the control of all Node Bs in the RNS and their associated resources. In this case, the RNC plays the role of Controlling RNC (CRNC) for the Node Bs in the RNS. In addition to the control of Node Bs, the RNC is also responsible for controlling the connection of the mobile terminal to the cellular network. The RNC in charge of a particular user connection plays the role of a Serving RNC (SRNC) for the user.

A mobile terminal accesses the cellular network via one or several radio links which are accessible through a so called air interface. Data transmitted from the mobile terminal are carried over the air interface to one or several Node Bs. Each Node B transmits the data received from the mobile terminal together with measurement results to the associated Controlling RNC, via the Iub interface.

The Controlling RNC for a Node B through which the mobile terminal is accessing the network may also be the Serving RNC for the mobile terminal or a different RNC. In the latter case, the Controlling RNC for the Node B plays also the role of a Drift RNC with respect to the user connection, because data must be forwarded ("drifted") by this RNC to the Serving RNC responsible for the control of the user connection, using the Iur interface.

In UMTS the CN consists of a circuit-switched part (CS domain) and a packet-switched part (PS domain). Each of them is composed of several elements. One major element in the CS domain is the Mobile Switching Center (MSC), responsible e.g. for switching and signaling functions for mobile terminals, including support of user mobility through handover and location update procedures. Moreover, access to external circuit-switched networks is provided through a so called Gateway MSC. The MSC communicates with a Home Location Register (HLR) and a Visitor Location Register (VLR) which are databases storing permanent subscriber information and temporary user location information, respectively.

In the PS domain, a Serving GPRS Support Node (SGSN), can be considered as the counterpart of the MSC. The SGSN is responsible for managing the packet-switched related communications within the CN. The SGSN communicates with a Gateway GPRS Support Node (GGSN), which provides access to an external packet-switched network such as the Internet. A network address is assigned to each mobile terminal by the GGSN. This network address is valid in the external packet-switched network. This allows the mobile terminal to communicate with other terminals or servers in the external network.

The data that originated from the mobile terminal are transmitted through the CN to the receiver. This is for example a terminal connected to an external circuit-switched network such as the ISDN, an external packet-switched network like the Internet or another mobile terminal. If the receiver is another mobile terminal the data are transmitted from the CN to this mobile terminal via its associated Serving RNC and the Node B that controls the cell in which the other mobile terminal is located or the Node Bs responsible for those cells in which the terminal has an active radio link, in case of soft handover.

The transmission of data described so far relates mainly to user data, e.g. voice related data, that are dedicated to a specific receiver. Besides this user data, within a cellular network several control information have to be transmitted to make sure the cellular network operates properly. The control information is called signaling.

Signaling related data deal with subjects like handover control (including macro diversity), power control, exchange of measurements between network and terminals, mobility and location management.

A mobile terminal can be connected to several cells simultaneously. This option is called macro diversity. The set of cells the mobile terminal is connected to simultaneously is called the active set of the mobile terminal. The data streams received via the different cells of the active set are combined by the Node B (in case of softer handover, i.e. several cells in the active set belonging to the same Node B) or by the RNC (in case of soft handover, i.e. cells in the active set belong to different Node Bs). The mobile terminal measures the signal levels of these cells and reports the measurement results via the controlling Node Bs to the RNC. The RNC evaluates the reported data and causes the mobile terminal to change the set of active cells if necessary.

Soft handover involves the addition of a new radio link through another Node B in case of transmission quality deterioration to improve transmission quality (e.g. by reducing the error frame rates).

Since the same frequencies are used in an active cell and in the adjacent cells there exists the risk of interference.

Thus, power control is an important issue. In UMTS exist different power control techniques, e.g. the open-loop power control and the closed loop power control. According to the open loop power control the Node B broadcasts information about the minimum power needed to enable a mobile terminal to gain access to the cellular network. According to the closed loop power control the Node B transmits information to the mobile terminal to adjust the transmission power, according e.g. to a signal-to-interference ratio. The closed loop power control is a kind of dedicated signaling, since those information are not sent to all mobile terminals that reside in a cell (via broadcasting) but is dedicated to one specific mobile terminal.

Data transferred within UMTS can be divided into two groups. These are represented by control channels for transmitting signaling related data and traffic channels for transmitting user data. Examples for control channels and traffic channels are the Broadcast Control Channel (BCCH): Broadcast of system information, i.e. information related to the radio environment like code values in the cell and in the adjacent cells, power levels, etc.;

the Paging Control Channel (PCH): Paging is performed in order to find out the actual location of the user and to notify the user of the arrival of an incoming call;

the Common Control Channel (CCCH): Used for tasks common for all mobile terminals residing in the cell, for instance the initial access procedures. Since many users may use the CCCH simultaneously they are identified by unique identity (IMSI, International Mobile Subscriber Identifier, or U-RNTI, UTRAN Radio Network Temporary Identity);

the Dedicated Control Channel (DCCH): Control information of dedicated and active connections, used for instance for handover control and measurement exchange;

the Dedicated Traffic Channel (DTCH): Most important channel for the transmission of dedicated user traffic (user data), e.g. voice data; and Common Traffic Channel (CTCH): Information that is to be sent to all mobile terminals or a specific group of mobile terminals in the cell. This channel is mainly used for Cell Broadcast Services, which consist in the delivery of short text messages to all users or to the subscribed users in a cell.

Logical channels are mapped to transport channels within a layer—the so called MAC (Medium Access Control) layer—of the UTRAN protocol stack. The mapping may also include multiplexing several logical channels into the same transport channel. Transport channels are bearer services (i.e. transmission services) offered by the physical layer of the air interface.

Another layer—the so called physical layer—maps transport channels to physical channels. Physical channels correspond to actual radio channels used for the communication across the radio interface.

For extending a cellular network an ad-hoc network can be used. With an ad-hoc network extension a mobile terminal (here: mobile client) that is connected to the ad-hoc network communicates with the cellular network not directly but via another mobile terminal (here: mobile relay). The mobile relay is connected to the ad-hoc network and to the cellular network. Data that are transmitted from the mobile client and are dedicated to the cellular network are first transmitted from the mobile client to the mobile relay using the ad-hoc network. The mobile relay then relays these data by forwarding it to the cellular network. Data that are transmitted from the cellular network and are dedicated to the mobile client are first transmitted from the cellular network to the mobile relay using the air interface. The mobile relay then relays these data by forwarding it to the mobile client via the ad-hoc network. Examples of an ad-hoc network are WLAN (wireless local area network) and Bluetooth.

An Example of the mode of operation of an ad-hoc network is described in the European patent application "Air interface protocols for a radio access network with ad-hoc extensions" that has the same filing date and the same applicant as the present invention.

Extending a cellular network by an ad-hoc network can result in an improvement of cell capacity and coverage. If, for example, a mobile terminal is placed far away (in terms of reception level, and not necessarily physical distance) from a Node B that is in charge of one of several of the cells in the active set of the mobile terminal, it transmits data with a very high transmission power. This in turn can interfere with other data transmissions in the same or adjacent cells. Using an ad-hoc network extension and having a mobile relay within reach of the mobile terminal, the mobile relay can connect to a Node B with a higher quality and lower transmission power than the mobile terminal. Thus the coverage can be raised and the risk of interference with other connections will be reduced.

Since one mobile relay can in principle relay the data transmitted from different mobile terminals at a given time, the coverage can be increased further on. It is also possible, that the communication between the mobile relay and the mobile client takes place across a number of intermediate so called ad-hoc terminals such that the data that are transmitted from the mobile terminal and that are dedicated to the cellular network (or vice versa) are forwarded several times by intermediate ad-hoc terminals between the mobile client and the mobile relay. This is called a multi-hop ad-hoc connection.

Ad-hoc networks typically are of limited coverage and/or of limited capacity. If, for example, the ad-hoc network is realized by Bluetooth, the distance between the mobile client and the mobile relay is only allowed to be in the range of some meters. Thus, if a mobile client is connected to the cellular network via an ad-hoc interface and a mobile relay, there is a likelihood that the mobile client leaves the region that is covered by the ad-hoc network. This means, that the connection between the mobile client and the mobile relay will be aborted and that another connection has to be established.

It can also cause an abortion, if the mobile relay leaves the region that is covered by the ad-hoc network or if the mobile relay stops the relaying of data, e.g. because the mobile relay is switched off or a hardware failure occurs.

An abortion of the ad-hoc network also leads to an abortion of the connection between the mobile client and the cellular network since the cellular network gets no longer any response from the mobile client and therefore it will abort the connection. In this case, the connection between the mobile client and the cellular network must be reestablished either directly or through the ad-hoc network.

Each abortion causes a certain delay which is an overhead in time. This is due to the fact, that it takes time to recognize the abortion, to find another mobile relay, to establish the ad-hoc connection to the other mobile relay, to establish a connection from the mobile relay to the cellular network, to establish the relayed connection between the mobile client and the cellular network and to start data transmission from where it was aborted. This can reduce the reliability of an ad-hoc network extension compared to a direct connection between the mobile client and the cellular network via the air interface.

Moreover, if the connection is aborted in a way described above, there is the possibility of data loss. Even if an error detection mechanism is involved and can save the data transmission from data loss, it will take time and resources to detect which data are endangered to be lost and to perform appropriate actions, like a retransmission of these data after a new connection is established.

The negative effects due to an abortion of the ad-hoc network can increase significantly if the mobile client is located within the peripheral zone of the ad-hoc network. In the peripheral zone the signal quality typically varies over time. Thus, it is conceivable that the ad-hoc network connection between the mobile client and the mobile relay is aborted due to a bad signal quality and shortly after the abortion the signal quality will increase, such that again a connection will be established between the mobile client and the same mobile relay as before. If the signal quality decreases again, the connection will be aborted and so forth.

The likelihood of an abortion increases, if the mobile client is connected to the mobile relay via a multi-hop connection. In a multi-hop connection besides the mobile client and the mobile relay several other mobile terminals are involved. These mobile terminals are connected with each other and/or with the mobile client and/or the mobile relay via the ad-hoc network or even via various ad-hoc networks. Thus, the likelihood of an abortion of one connection may increase with the number of mobile terminals involved.

SUMMARY OF THE INVENTION

It is therefore an object of the present invention to reduce the overhead induced by an ad-hoc network connection and still reap the benefits of the ad-hoc network extension of the cellular network.

According to the present invention this object is solved by a method for transmitting data between a mobile client and a cellular network of the above-mentioned kind, wherein a first part of the data that are transmitted from the mobile client towards the cellular network are transmitted directly via the air interface. A second part of the data that are transmitted from the mobile client towards the cellular network are transmitted via the ad-hoc network and the mobile relay.

Additionally and/or alternatively, the present invention is also provided to transmit a first part of the data that are transmitted from the cellular network towards the mobile client directly via the air interface and to transmit a second part of the data that are transmitted from the cellular network towards the mobile client via the mobile relay and the ad-hoc network.

In the present invention not all data that are transmitted between the mobile client and the cellular network are transmitted via the ad-hoc network. At least some data (the first part) are transmitted at least in one direction directly via the air-interface.

The present invention suggests, that in both directions a part of the data is transmitted directly and another part is transmitted via the ad-hoc network. It has to be stressed, that the data that are transmitted directly from the mobile client to the cellular network are not necessarily of the same kind as the data that are transmitted directly from the cellular network to the mobile client. This means, that the first part of the data that are transmitted from the mobile client to the cellular network comprises partly or totally other data than the first part of data that are transmitted directly from the cellular network to the mobile client. Accordingly, the second part of the data, that is transmitted via the ad-hoc network from the mobile client to the cellular network are not necessarily of the same kind as the second part of the data that is transmitted via the ad-hoc network from the cellular network to the mobile client.

The present invention also suggests to transmit all data that are transmitted in one direction (either from the mobile client to the cellular network or from the cellular network to the mobile client) together either via the air interface or via the ad-hoc network and the mobile relay, whereas the data that are transmitted in the other direction are split in a first part and a second part such that the first part is transmitted directly via the air-interface and the second part is transmitted via the ad-hoc interface.

The present invention therefore introduces maximum flexibility in deciding separately for each direction (mobile client to cellular network and vice versa), which kind of data have to be transmitted via the ad-hoc network and which kind of data have to be transmitted directly. If, for example, the mobile client is powered by battery wherein the battery is nearly discharged and assuming, that it takes more energy to send data directly than to send these data via the ad-hoc network but it takes less energy to receive data directly than via the ad-hoc network, then—in order to save battery power—it is possible that a major part or even all data are transmitted from the mobile client to the cellular network via the ad-hoc network and a major part or even all data are transmitted from the cellular network to the mobile client directly.

According to a preferred embodiment of the present invention at least a part of signalling data that is transmitted from the mobile client and dedicated to the cellular network is transmitted directly via the air interface from the mobile client to the cellular network and/or at least a part of signalling data that is transmitted from the cellular network and dedicated to the mobile client is transmitted directly via the air interface from the cellular network to the mobile client.

Signalling data deal with subjects like handover control (including macro diversity), power control, exchange of measurements between network and terminals, mobility and location management. In particular, signalling data are used to establish and control a connection between the mobile client and the cellular network. In case of an abortion of the ad-hoc network connection the mobile client can inform the cellular network (e.g. the RNC) through signaling data that the ad-hoc network connection is aborted and a new ad-hoc network connection to the same or to another mobile relay has to be established so that the data transmission can be continued. It is also conceivable, that the cellular network informs the mobile client about the abortion of the ad-hoc network, e.g. in case the cellular network detects a failure in the mobile relay.

Making the transmission of signalling data independent of the reliability of the ad-hoc network connection enables the mobile client in case of an abortion of the ad-hoc network e.g.

- to inform the cellular network of whether the mobile client wants to abort the connection between the mobile client and the cellular network at all or not;
- to request the cellular network to wait until the ad-hoc network connection is reestablished (maybe via another mobile relay); and/or
- to suggest or to allow to switch to a direct transmission mode wherein all data are transmitted directly via the air-interface until the ad-hoc network connection is reestablished.

It also enables the cellular network e.g.

- to inform the mobile client of whether the cellular network wants to abort the connection to the mobile client at all or not;
- to inform the mobile client about how long the cellular network will wait for reestablishing the ad-hoc network connection; and/or
- to suggest or to allow to switch to a direct transmission mode wherein all data are transmitted directly via the air-interface until the ad-hoc network connection is reestablished.

Since the abortion of an ad-hoc connection does not affect the transmission of signalling data, the abortion of the ad-hoc network does not necessarily cause a total abortion of the connection between the mobile client and the cellular network. Instead, the data transmission connection between the mobile client and the cellular network can switch to a so called wait-state until the ad-hoc network connection is reestablished or can switch to a direct data transmission via the air-interface for all data until the ad-hoc network connection is reestablished.

This significantly reduces the overhead induced by the abortion of the ad-hoc network connection, since according to the present invention the abortion of the ad-hoc network connection not necessarily causes a total abortion of the connection between the mobile client and the cellular network. Thus, there is no time needed to reestablish the connection between the mobile client and the cellular network. Moreover, this embodiment induces the possibility to transmit all data directly via the air-interface until the ad-hoc network is reestablished.

The present invention further suggests that at least a part of common signalling data is transmitted from the cellular network directly via the air interface to the mobile client. Common signalling data relate to e.g. system information, i.e. information related to the radio environment like the code values in the cell and in the adjacent cells, or power levels for open loop power control that are broadcasted by the cellular network via the BCCH. Cell Broadcast Services (CBS), consisting of the delivery of short text messages to all users or to the subscribed users in a cell via the CTCH, can be handled in the same manner as common signalling.

Since common signaling is transmitted by the cellular network mostly independent of whether the mobile client is connected to the cellular network (directly and/or via an ad-hoc network) or not, also transmitting these data via the ad-hoc network means transmitting these data twice. Thus, an improvement at least in the capacity of the ad-hoc network can be achieved if these data are only transmitted via the air-interface.

Preferably, at least a part of time-critical user data that are transmitted from the mobile client and dedicated to the cellular network are transmitted directly via the air interface from the mobile client to the cellular network and/or at least a part of time-critical user data that are transmitted from the cellular network and dedicated to the mobile client are transmitted directly via the air interface from the cellular network to the mobile client. This preserves the quality of data transmission between the mobile client and the cellular network, since an abortion of the ad-hoc network will not affect the transmission of time-critical data. Nevertheless, data that are not time-critical are transmitted via the ad-hoc network, thus aiding in increasing the capacity of the air-interface of the cellular network.

In a preferred embodiment of the invention at least a part of packet-switched user data that are transmitted from the mobile client and that are dedicated to the cellular network are transmitted via the ad-hoc network and the mobile relay to the cellular network and/or at least a part of packet-switched user data that are transmitted from the cellular network and dedicated to the mobile client are transmitted via the mobile relay and the ad-hoc network to the mobile client.

Packet-switched data are transmitted packet-wise. This means, that each packet is transmitted in some sense independent of the other packets. For example, in a packet-switched network different packets can take different routes from a sender to a receiver. The receiver collects the packets, puts them in the right order and restores the original information. If a packet is lost, there exist mechanisms to request a retransmission of this specific packet basically without having the necessity to stop the whole process of transmission and to retransmit all packets that were sent after the lost packet.

Transmitting packet-switched data via the ad-hoc interface means that in case of an abortion the packets can be retransmitted via another ad-hoc network causing only little overhead. This embodiment also opens the possibility in case of an abortion of the ad-hoc network to transmit the packets via the air interface until the ad-hoc network extension is reestablished or another ad-hoc network extension is established. In the case of packet-switched data the switching between transmitting data via the ad-hoc network extension or transmitting data directly via the air interface can be performed very fast. This again reduces the time consuming effect of an abortion of the ad-hoc network connection.

The object of the present invention is also solved by mobile client as mentioned above according to claim 6 or 7.

Furthermore, the object of the present invention is solved by a telecommunications system as mentioned above according to claim 8 or 9.

Moreover, the object of the present invention is solved by a computer program according to one of the claims 10 to 12.

BRIEF DESCRIPTION OF THE DRAWINGS

Further features and advantages of the present invention are explained in more detail below with reference to the accompanying drawings. The figures show:

FIG. 1 shows a mobile client 1 that communicates via an ad-hoc network 2 using an ad-hoc network interface 2*a*. with a mobile relay 3. The mobile relay 3 is connected to a cellular network 4, e.g. a UMTS cellular network 4. The cellular network 4 includes a Node B 5, a Radio Network Controller (RNC) 6 and a Core Network 7.

Figure 1:
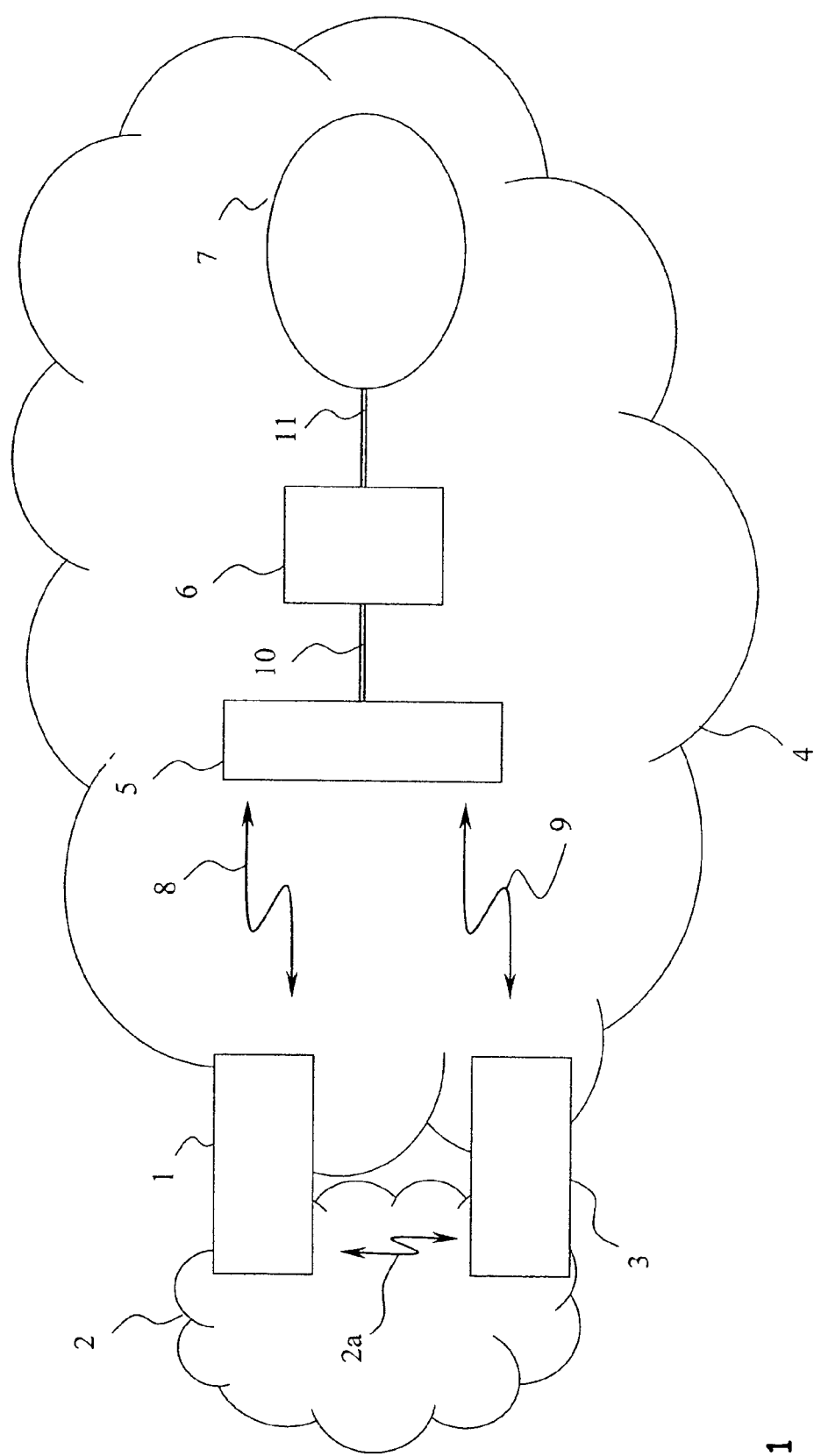
FIG. 1 a general view of a cellular network extended by an ad-hoc network.

The Node B 5 is a physical unit for radio transmission (and reception) and is attached to one or more cells of the cellular network 4.

Typically, several Node Bs 5 are associated with one RNC 6 and are controlled by this RNC 6. Particularly, the control includes the management of resources in the Node Bs 5.

The mobile client 1 communicates directly with at least one Node B 5 via a radio link that is accessible via an air interface 8 (e.g. Uu in UMTS). It is also possible to communicate with several Node Bs in parallel (in case of soft handover). The mobile relay 3 communicates with the Node B 5 via a radio link that is also accessible via an air interface 9 (e.g. Uu in UMTS). The Node B 5 communicates with the RNC 6 via the so-called Iub interface 10, making use of an underlying transmission network, which is usually a terrestrial network. The Node B 5 is controlled by the RNC 6. Both are part of the Radio Access Network (RAN). In UTRAN (the RAN of the UMTS cellular network 4) the transmission network can be based on ATM or IP transport.

Finally, the communication between an RNC 6 and the Core Network 7 (and hence between RAN and CN) takes place across a so-called Iu interface 11, which makes use of an underlying ATM-based or IP-based backbone.

Figure 2:
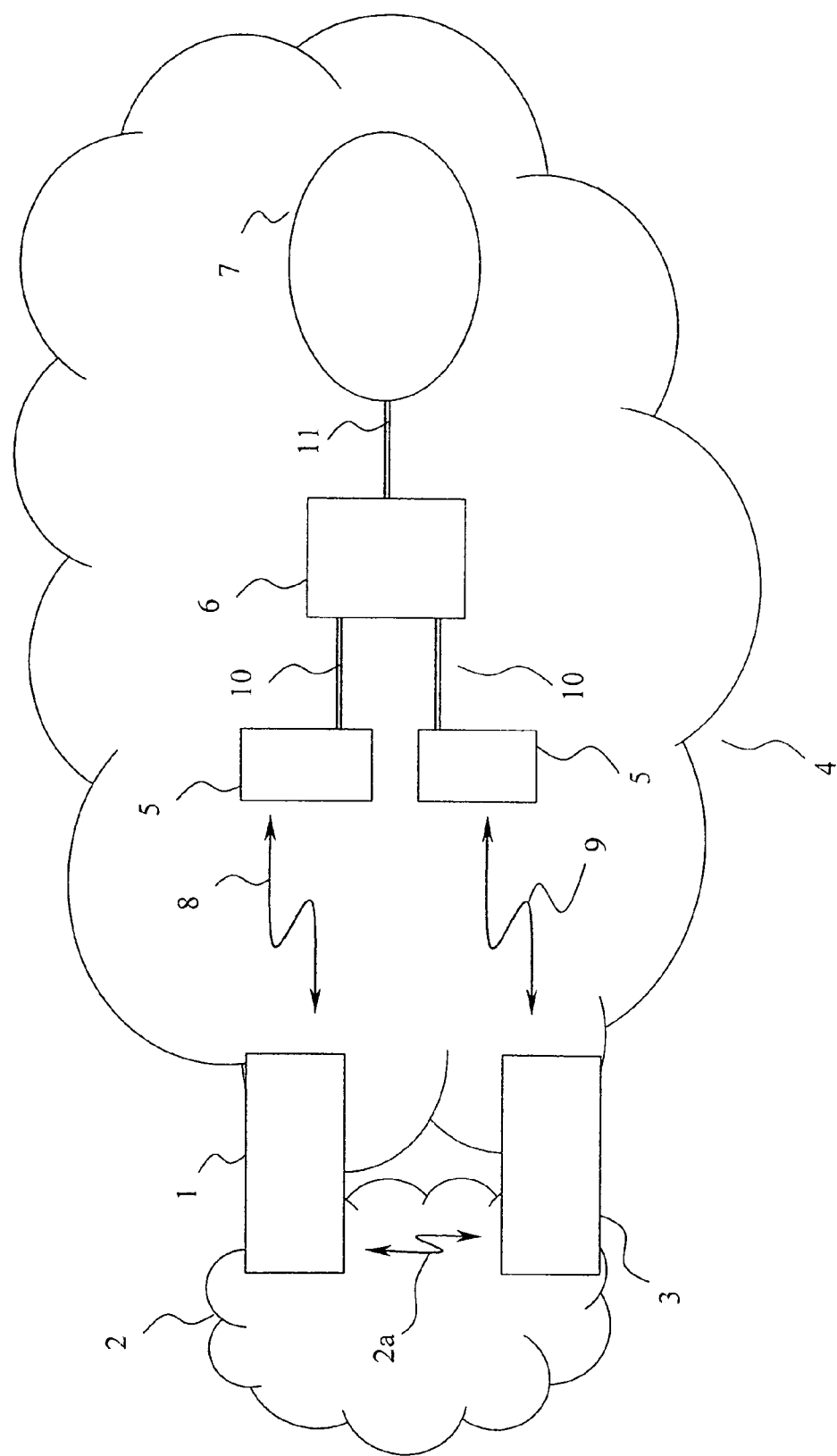
FIG. 2 a general view of a cellular network extended by an ad-hoc network where the mobile client and the mobile relay are connected to different Node Bs.

FIG. 2 shows a variation of the cellular network 4 that is extended by the ad-hoc network 2. Here, the mobile client 1 and the mobile relay 3 communicate with different Node Bs. This reflects the case, that the mobile client 1 and the mobile relay 3 reside in different cells of the cellular network 4. In the situation shown in FIG. 2, both Node Bs 5 are connected via the transmission network 10 with the same RNC 6. But it is also conceivable, that the different cells in which the mobile client 1 and the mobile relay 3 reside are controlled by different RNCs 6, such that the Node Bs 5 are connected via the transmission network 10 with different RNCs 6. In case the different RNCs 6 belong to different Radio Network Subsystems (RNS) they communicate with each other using the Iur interface.

Figure 3:
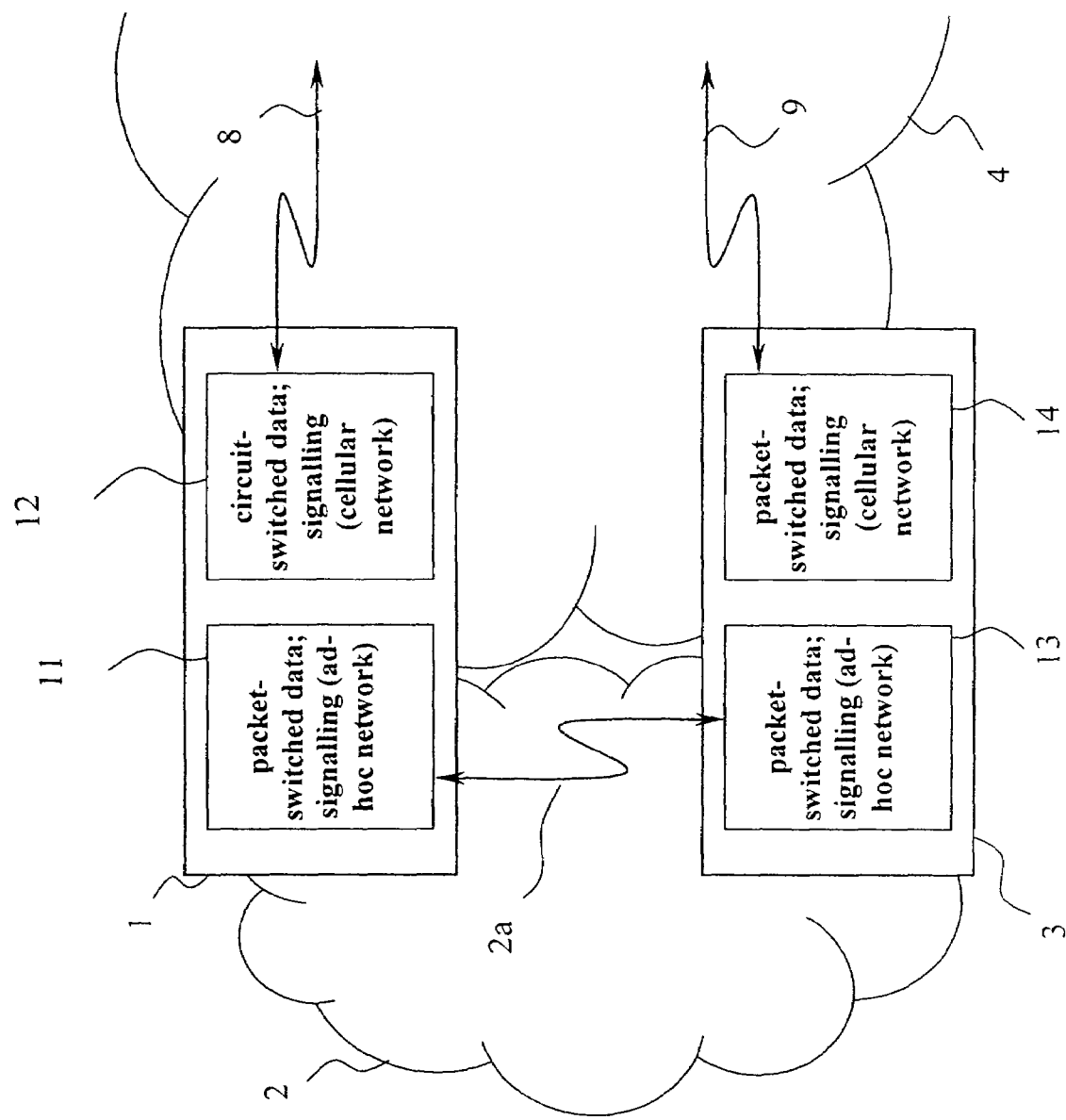
FIG. 3 a general view of the data flow of the first part and the second part of the transmitted data.

FIG. 3 shows an example of the data flow between the mobile client 1 and the cellular network 4. The mobile client 1 comprises a first protocol stack 11 and a second protocol stack 12. The mobile relay 3 comprises a first protocol stack 13 and a second protocol stack 14.

The mobile client 1 communicates directly with the cellular network 4—particularly with the Node B 5—via the air interface 8. Data, that are transmitted from the mobile client 1 to the cellular network 4 via the air interface 8 are generated by some higher layer of the second protocol stack 12 of the mobile client 1 and are passed down the layers of the second protocol stack 12 to the physical layer of the second protocol stack 12. The physical layer deals with specific physical features of the air interface 8 and causes the transmission of the data from the mobile client 1 towards the cellular network 4—particularly towards Node B 5.

Almost concurrently, the mobile client 1 communicates with the mobile relay 3 via the ad-hoc network 2. Data, that are transmitted from the mobile client 1 to the cellular network 4 via the ad-hoc network 2 and the mobile relay 3 are generated by an application or some higher layer of the first protocol stack 11 of the mobile client 1.

Data transmitted from the mobile client 1 via the ad-hoc network are received by the mobile relay 3 via some layers of the first protocol stack 13 and passed up to higher layers of the first protocol stack and/or transferred to some predefined layers of the second protocol stack 14. The received data are thus processed, terminated and/or relayed. In the latter case, the second protocol stack 14 causes a predefined part of the data to be transmitted to the cellular network 4 via the air interface 9.

A detailed description of an example of the protocol stacks and the data flow between the mobile client 1 and the mobile relay 3 is given in the European patent application "Air interface protocols for a radio access network with ad-hoc extensions" that has the same filing date and the same applicant as the present invention. It is explicitly stated that the description given in the above mentioned application shall be viewed as part of this description.

Data, that are transmitted between the mobile client 1 and the cellular network 4 directly via the air interface are for example at least common signalling data. In UMTS, common signalling data are for example transmitted via the BCH. The BCH is mapped by the physical layer to the P-CCPCH (Primary Common Control Physical Channel) which causes the common signalling data to be broadcasted by the cellular network 4 towards the mobile terminals and in particular to the mobile client 1. Since these data are broadcasted anyway through the cellular interface, the overhead of transmitting data over an ad-hoc network can be reduced by not transmitting these data also via the ad-hoc network.

For its correct operation, the mobile client 1 requires also information sent on the paging control channel (PCCH), or common control channel (CCCH). For common signalling, it is possible to use either a relayed connection or direct cellular access to the associated physical channels (P-CCPCH, S-CCPCH, and PRACH). If signalling data (e.g. RRC messages associated to the mobile client 1) are transmitted via the ad-hoc network 2 and the mobile relay 3, these data are preferably encapsulated within signalling messages of the signalling protocol related to the ad-hoc network 2 connection between the mobile client 1 and the mobile relay 3. Intermediate solutions with direct access to some of these channels (e.g. P-CCPCH) and a relayed connection for other ones (e.g. S-CCPCH and PRACH) is also possible.

It is also conceivable, to transmit any signalling data directly between the mobile client 1 and the cellular network 4. This can be advantageously since these data are transmittable even in case of an abortion of the connection via the ad-hoc network 2. This enables the mobile client 1 to inform the cellular network 4 about an abortion of the ad-hoc network 2 and to request the cellular network (e.g. the RNC) to not abort the connection between the mobile client 1 and the cellular network 4 at all but rather to wait until another ad-hoc network 2 connection is established.

Furthermore, it is conceivable that the mobile client 1 and the cellular network 4 negotiate to transmit all kind of data directly via the air interface 8 until the ad-hoc network 2 connection is reestablished or another ad-hoc network 2 connection is established.

In addition, FIG. 3 shows an embodiment of the invention where also the circuit-switched data are transmitted between the mobile client 1 and the cellular network 4 directly via the air interface 8. This can be especially favorable if the circuit-switched data refer to time-critical data where a delay due to an abortion of the ad-hoc network 2 would not be tolerable. In the worst case, even the small amount of delay introduced by the relaying mechanism itself may be unacceptable.

Data transmitted between the mobile client 1 and the mobile relay 3 via the ad-hoc network 2 are at least signalling data that refer to the ad-hoc network 2 itself. As shown in FIG. 3, in addition packet-switched data are transmitted via the ad-hoc network 2 and the mobile relay 3. Packet-switched data are predominantly not very sensitive to delay. Moreover, packet-switched data are designed to be transmittable via different routes and thus via different network connections. In case of an abortion of the ad-hoc network 2 the transmission of the packet-switched data will be stalled until another ad-hoc network 2 connection is established or the same ad-hoc network 2 is reestablished. Meanwhile, the mobile client 1 and the cellular network 4 can decide to transmit the packet-switched data directly via the air interface 8.

However, it is possible, that even packet-switched data are time-critical. This means, that the mobile client 1 and the cellular network 4 can determine to transmit at least time-critical packet-switched data directly via the air interface 8 as long as the ad-hoc network 2 connection is aborted. It is also conceivable to transmit time-critical packet-switched data always directly between the mobile client 1 and the cellular network 4 and to transmit only packet-switched data that are not time-critical via the ad-hoc network 2 and the mobile relay 3.

It is furthermore conceivable, to transmit any time-critical data—independent of whether these data are circuit-switched or packet-switched—directly via the air interface and/or to transmit any data that are not time-critical—independent of whether these data are circuit-switched or packet-switched—via the ad-hoc network 2.

The data flow between the mobile client 1 and the cellular network 4 via the ad-hoc network 2 connection and directly via the air interface 8 is described exemplarily by a variety of different data:

Signalling between mobile client 1 and mobile relay 3 according to the ad-hoc network 2 is generated and processed by the first protocol stacks 11 and 13 of the mobile client 1 and the mobile relay 3 and is transmitted via the ad-hoc network 2.

Signalling between the mobile client 1 and the cellular network 4 is generated and processed by the second protocol stack 12 and an appropriate protocol stack of one or more components of the cellular network 4, e.g. the Node B 5 and the RNC 6. In particular, it is conceivable that at least common signaling data are transmitted from the cellular network 4 towards the mobile client 1 directly via the air interface 8, e.g. by broadcasting. The concurrent use of the direct cellular link (via the air interface 8) and the link via the ad-hoc network 2 and the mobile relay 3 allows different configurations according to whether both dedicated and common signalling, only dedicated signalling, or only common signalling are sent via the direct cellular connection (e.g. the air interface 8). Since dedicated signalling is usually more critical, it justifies the use of a direct connection. However, common and shared channels are present in a cell independently of its access by the mobile client. Therefore, transmitting common and shared signalling via the direct cellular connection does not require additional power or radio resources.

Signalling between the mobile relay 3 and the cellular network 4 is generated and processed by the second protocol stack 14 and an appropriate protocol stack of one or more components of the cellular network 4, e.g. the Node B 5 and the RNC 6.

Time-critical data are transmitted directly between the mobile client 1 and the cellular network 4. It is also conceivable, to transmit time-critical data via the ad-hoc network 2 whenever it is available and to switch to a direct transmission via the air interface 8 in case of an abortion of the ad-hoc network 2.

Circuit-switched data are transmitted directly between the mobile client 1 and the cellular network 4. It is conceivable, to transmit circuit-switched data via the ad-hoc network 2 whenever it is available and to switch to a direct transmission via the air interface 8 in case of an abortion of the ad-hoc network 2. It is also conceivable to distinguish between time-critical circuit-switched data and circuit switched data, that are not time-critical. This could mean for example, that only time-critical circuit-switched data are transmitted directly between the mobile client 1 and the cellular network 4 whereas circuit-switched data that are not time-critical are transmitted via the ad-hoc network 2. This could also mean, that in case of transmitting even time-critical circuit-switched data via the ad-hoc network 2 only time-critical circuit-switched data are transmitted directly if an abortion of the ad-hoc network 2 occurs.

Packet-switched data are transmitted via the ad-hoc network 2 and the mobile relay 3. It is conceivable, to stall the transmission in case an abortion of the ad-hoc network 2 occurs and to start transmission again, if the ad-hoc network 2 has been reestablished or another ad-hoc network 2 has been established. It is also conceivable, to transmit packet-switched data via the ad-hoc network 2 whenever it is available and to switch to a direct transmission (possibly after a predefined amount of time has elapsed) via the air interface 8 in case of an abortion of the ad-hoc network 2. It is also conceivable to distinguish between time-critical packet-switched data and packet-switched data, that are not time-critical. This could mean for example, that only time-critical packet-switched data are transmitted directly between the mobile client 1 and the cellular network 4 whereas packet-switched data that are not time-critical are transmitted via the ad-hoc network 2. This could also mean, that in case of transmitting even time-critical packet-switched data via the ad-hoc network 2 only time-critical packet-switched data are transmitted directly if an abortion of the ad-hoc network 2 occurs.

It is conceivable that only in one direction—either from the mobile client 1 to the cellular network 4 or vice versa—a first part of the data are transmitted directly and the second part is transmitted via the ad-hoc network 2 extension, whereas in the other direction all data are transmitted directly or all data are transmitted via the ad-hoc network 2 interface. This could be realized in that only the common signalling data, that are transmitted from the cellular network 4 to the mobile client 1 are transmitted directly whereas all other data in both directions are transmitted directly via the ad-hoc network 2 and the mobile relay 3. Of course, the data that are to be transmitted can be divided into a first part and into a second part according to various considerations, eventually much more sophisticated than the criteria (signalling related, common signalling related, packet-switched, circuit-switched, time-critical) described so far.

Several different combinations are conceivable and may be reasonable according to special requirements of the cellular network, the ad-hoc network 2, the data to be transmitted, applications and/or user needs.

The invention claimed is:

1. A method for transmitting data between a mobile client and a cellular network, wherein the cellular network comprises an air interface, wherein the mobile client is connected to an ad-hoc network and communicates via the ad-hoc network with a mobile relay that is connected to the ad-hoc network and the cellular network, and wherein the mobile relay relays data that are transmitted from the mobile client towards the cellular network and/or data that are transmitted from the cellular network towards the mobile client, wherein
   a first part of the data that are transmitted from the mobile client towards the cellular network are transmitted directly via the air interface and a second part of the data that are transmitted from the mobile client towards the cellular network are transmitted via the ad-hoc network and the mobile relay; and/or
   a first part of the data that are transmitted from the cellular network towards the mobile client are transmitted directly via the air interface and a second part of the data that are transmitted from the cellular network towards the mobile client are transmitted via the mobile relay and the ad-hoc network.

2. The method of claim 1, wherein
   at least a part of signalling data that is transmitted from the mobile client and dedicated to the cellular network is transmitted directly via the air interface from the mobile client to the cellular network andlor
   at least a part of signalling data that is transmitted from the cellular network and dedicated to the mobile client is transmitted directly via the air interface from the cellular network to the mobile client.

3. The method of claim 1, wherein at least a part of common signalling data is transmitted from the cellular network directly via the air interface to the mobile client.

4. The method of claim 1, wherein
   at least a part of time-critical user data that are transmitted from the mobile client and dedicated to the cellular network are transmitted directly via the air interface from the mobile client to the cellular network and/or
   at least a part of time-critical user data that are transmitted from the cellular network and dedicated to the mobile client are transmitted directly via the air interface from the cellular network to the mobile client.

5. The method of claim 1, wherein
   at least a part of packet-switched user data that are transmitted from the mobile client and dedicated to the cellular network are transmitted via the ad-hoc network and the mobile relay to the cellular network andlor
   at least a part of packet-switched user data that are transmitted from the cellular network and dedicated to the mobile client are transmitted via the mobile relay and the ad-hoc network to the mobile client.

6. A mobile client that is connectable to an ad-hoc network and connectable to a cellular network wherein the ad-hoc network comprises an ad-hoc network interface and the cellular network comprises an air interface for data transmission, wherein the mobile client is simultaneously connectable to the ad-hoc network and to the cellular network and wherein the mobile client comprises means
   to transmit a first part of the data that have to be transmitted from the mobile client towards the cellular network directly over the air interface; and to transmit a second part of the data over the ad-hoc network interface via the ad-hoc network and a mobile relay; and/or
   to receive a first part of the data that are transmitted from the cellular network towards the mobile client directly by the air interface; and to receive a second part of the data via the mobile relay by the ad-hoc network interface;
   wherein the mobile client comprises means to execute a method according to claim 1.

7. A telecommunications system comprising a cellular network, an ad-hoc network, a mobile client and a mobile relay wherein the mobile client is connected to the cellular network and the ad-hoc network and comprises means for communicating with the mobile relay via the ad-hoc network, and wherein the mobile relay is connected to the ad-hoc network and the cellular network and comprises means to relay data that are transmitted from the mobile client to the cellular network and/or data are transmitted from the cellular network to the mobile client wherein the telecommunications system comprises means
   to transmit a first part of the data that have to be transmitted from the mobile client towards the cellular network directly over the air interface and to transmit a second part of the data over the ad-hoc network interface via the ad-hoc network and the mobile relay; and/or
   to transmit a first part of the data that have to be transmitted from the cellular network towards the mobile client directly over the air interface and to transmit a second part of the data via the ad-hoc network and the mobile relay;
   wherein the telecommunications system comprises means to execute a method according to claim 1.

8. Computer program that can be run on a data processing unit, in particular on a mobile client and/or a mobile relay, wherein the computer program is programmed to perform a method according to claim 1, if the computer program is run on the data processing unit.

9. Computer program of claim 8, wherein the computer program is stored on a storage device, in particular a random access memory (RAM), a read only memory (ROM) or a flash memory.

10. Computer program of claim 8, wherein the computer program is stored on a compact disc (CD), a digital versatile disc (DVD) or a hard disc.

11. A mobile client that is connectable to an ad-hoc network and connectable to a cellular network wherein the ad-hoc network comprises an ad-hoc network interface and the cellular network comprises an air interface for data transmission, wherein the mobile client is simultaneously connectable to the ad-hoc network and to the cellular network and that the mobile client comprises means
   to transmit a first part of the data that have to be transmitted from the mobile client towards the cellular network directly over the air interface; and to transmit a second part of the data over the ad-hoc network interface via the ad-hoc network and a mobile relay; and/or
   to receive a first part of the data that are transmitted from the cellular network towards the mobile client directly by the air interface; and to receive a second part of the data via the mobile relay by the ad-hoc network interface.

12. Telecommunications system comprising a cellular network, an ad-hoc network, a mobile client and a mobile relay wherein the mobile client is connected to the cellular network and the ad-hoc network and comprises means for communicating with the mobile relay via the ad-hoc network, and wherein the mobile relay is connected to the ad-hoc network and the cellular network and comprises means to relay data that are transmitted from the mobile client to the cellular network and/or data are transmitted from the cellular network to the mobile client wherein the telecommunications system comprises means to transmit a first part of the data that have to be transmitted from the mobile client towards the cellular network directly over the air interface and to transmit a second part of the data over the ad-hoc network interface via the ad-hoc network and the mobile relay; and/or to transmit a first part of the data that have to be transmitted from the cellular network towards the mobile client directly over the air interface and to transmit a second part of the data via the ad-hoc network and the mobile relay.

* * * * *